United States Patent
Pillai et al.

(10) Patent No.: US 7,564,366 B2
(45) Date of Patent: Jul. 21, 2009

(54) SYSTEM AND METHOD FOR SETTING AN OSCILLATOR IN AN RFID TRANSPONDER

(75) Inventors: Vijay Pillai, Mukilteo, WA (US); Rene Martinez, Seattle, WA (US); Harley Heinrich, Snohomish, WA (US)

(73) Assignee: Intermec IP Corp., Everett, WA (US)

( * ) Notice: Subject to any disclaimer, the term of this patent is extended or adjusted under 35 U.S.C. 154(b) by 431 days.

(21) Appl. No.: 11/453,714

(22) Filed: Jun. 14, 2006

(65) Prior Publication Data
US 2007/0008072 A1    Jan. 11, 2007

Related U.S. Application Data

(60) Provisional application No. 60/690,950, filed on Jun. 15, 2005.

(51) Int. Cl.
*G08B 13/14* (2006.01)
(52) U.S. Cl. .............. 340/636.18; 340/572.1; 340/572.4; 340/825.71; 340/10.41; 340/10.4
(58) Field of Classification Search ............ 340/636.18, 340/10.1, 10.4, 572.1, 825.72, 572.4, 572.5, 340/572.7, 825.57, 825.71, 10.41, 10.42
See application file for complete search history.

(56) References Cited

U.S. PATENT DOCUMENTS

| | | | | |
|---|---|---|---|---|
| 6,150,921 A | * | 11/2000 | Werb et al. ................ | 340/10.1 |
| 6,369,710 B1 | * | 4/2002 | Poticny et al. ............ | 340/572.1 |
| 7,023,342 B2 | * | 4/2006 | Corbett et al. ............ | 340/572.1 |
| 7,388,497 B1 | * | 6/2008 | Corbett et al. ............ | 340/572.4 |
| 7,394,324 B2 | * | 7/2008 | Diorio et al. .............. | 331/44 |

* cited by examiner

*Primary Examiner*—Toan N Pham
(74) *Attorney, Agent, or Firm*—O'Melveny & Myers LLP

(57) ABSTRACT

A system and method is provided for using a frequency division circuit to produce a desired frequency in a radio frequency identification transponder (RFID tag). In a preferred embodiment of the present invention, an RFID tag includes a frequency division circuit connected to a logic circuit and a oscillator. The logic circuit is adapted to identify at least one frequency associated with a received RF signal (e.g., the frequency of the signal, a frequency identified by the signal, etc.). This frequency is then used by the frequency division circuit to calibrate the frequency provided by the oscillator. In one embodiment of the present invention, the frequency division circuit includes at least one variable counter adapted to divide the frequency provided by the oscillator (i.e., the oscillation frequency) by a programmable factor to produce a desired frequency. The desired frequency is then provided to the logic circuit and used to modulate a received RF signal. In another embodiment of the present invention, the frequency division circuit further includes at least one fixed counter, wherein the fixed counter is not programmable. In this embodiment, the fixed counter is used to produce a particular (lower) frequency, and the variable counter is used to produce the desired frequency. Such an embodiment, for example, can be used to decrease the amount of time required to produce a desired frequency (e.g., by starting with a lower fixed frequency) and increase the amount of time available to perform alternate functions (e.g., communicate with external devices, etc.).

14 Claims, 2 Drawing Sheets

SYSTEM AND METHOD FOR SETTING AN OSCILLATOR IN AN RFID TRANSPONDER

CROSS-REFERENCE TO RELATED APPLICATION

This application claims the benefit pursuant to 35 U.S.C. § 119(e) of U.S. Provisional Patent Application No. 60/690,950, filed Jun. 15, 2005, which application is specifically incorporated herein, in its entirety, by reference.

BACKGROUND OF THE INVENTION

1. Field of the Invention

The present invention relates to radio frequency identification (RFID) devices, and more particularly to a system and method for setting an oscillator in an RFID transponder.

2. Description of Related Art

Radio Frequency Identification (RFID) base stations, which operate in conjunction with RFID transponders (tags), are used in a variety of applications (e.g., inventory-control, security, etc.). Typically, an item including an RFID tag (e.g., a container with an RFID tag inside) is brought into a "read zone" established by the base station. The base station transmits an interrogating RF signal that is modulated, in part, by the receiving tag. That is, in reading the tag, the base station generates and transmits a continuous wave electromagnetic disturbance at a particular carrier frequency. This disturbance is then modulated by the receiving tag in order to impart information (e.g., information stored within the tag) onto the signal. The modulated RF signal is then reflected back to the base station (i.e., backscattered) where the imparted information is extracted.

The frequency at which information is modulated onto the received RF signal is determined by the RFID tag, or more particularly, oscillation circuitry located therein. Traditionally, RFID tags include a logic circuit, a volatile memory device and a variable oscillator that can be programmed to oscillate at a particular frequency. The logic circuit is adapted to identify (i) the frequency at which the received RF signal is transmitted, known as the carrier frequency, and (ii) the frequency at which information has been modulated onto the received RF signal, known as the modulation frequency. The modulation frequency is then stored in the volatile memory and used by the variable oscillator, to generate a similar (or same) frequency. The generated frequency is then used by the logic circuit to modulate information (e.g., information stored in non-volatile memory, etc.) onto the received RF signal.

This allows the RFID tag to transmit information at the same frequency as it was received (or at a known relationship thereto). It also allows the RFID base station to receive information modulated at the same frequency as it was sent (or at a known relationship thereto). In other words, for example, if the RFID base station transmits an RF signal that includes information modulated at a particular frequency (e.g., 120 kHz), then the reflection of that signal should also include information modulated at the same (or substantially the same) frequency (e.g., 120 kHz).

One of the drawbacks associated with such a system is that analog circuits, such as variable oscillators, generally require a large amount of real estate and consume a large amount of power. This is especially true when analog circuits are compared to digital circuits.

Another drawback associated with such a system is that the variable oscillator needs to be calibrated every time the RFID tag enters a new "read zone." This is because the deduced modulation frequency (as identified by the logic circuit) is only stored in volatile memory, which is erased each time power to the memory device is lost or turned off. This is important because in passive RFID tags, where power is derived from received RF signals, the volatile memory is not being powered when the tag is between "read zones" and not receiving RF signals. It is also important in active RFID tags, which include an on-board power supply, because the tag is sometimes placed into a "sleep" state when it is between "read zones," which may result in power being removed (at least temporarily) from the memory device(s). If the deduced modulation frequency is erased, then the RFID tag is required to recalibrate its oscillation circuit every time it enters a "read zone," which wastes time that otherwise could be used to communicate information.

Thus, it would be advantageous to provide an oscillation circuit in an RFID tag that does not suffer from at least one of these drawbacks.

SUMMARY OF THE INVENTION

The present invention provides a system and method for setting an oscillator in a radio frequency identification transponder (RFID tag). Preferred embodiments of the present invention operate in accordance with an RFID tag that includes an antenna, a modulation circuit, a frequency division circuit, a logic circuit and an oscillator. The logic circuit is adapted to receive an RF signal from the antenna and to modulate information onto the RF signal via the modulation circuit. The logic circuit is further adapted to identify at least one frequency associated with the received RF signal. This may be, for example, the received RF signal's carrier frequency, the received RF signal's modulation frequency, a frequency associated with (or identified by) the received RF signal (e.g., a frequency-control signal as sent by the RFID base station), etc. The frequency is then used by the frequency division circuit to calibrate the frequency provided by the oscillator.

In a preferred embodiment of the present invention, the frequency division circuit performs the frequency calibration function by dividing the frequency provided by the oscillator. For example, if the desired frequency (e.g., the frequency needed by the logic circuit) is 20 kHz and the frequency of the oscillator is 100 kHz, then the frequency division circuit would divide the oscillation frequency by five (100/5=20) and provide the resulting frequency (i.e., 20 kHz) to the logic circuit. Similarly, if the desired frequency is 200 kHz and the frequency of the oscillator is 20 kHz, then the frequency division circuit would divide the oscillation frequency by ⅒ (or multiply the oscillation frequency by ten) and provide the resulting frequency (i.e., 200 kHz) to the logic circuit. By using a frequency division circuit, the frequency provided by the oscillator can be calibrated to a desired (e.g., measured) frequency.

In a first embodiment of the present invention, the frequency division circuit includes a variable counter that can either be programmed at the factory (e.g., via hard wire signal) or in the field (e.g., via a frequency-control signal as sent by an RFID base station).

In a second embodiment of the present invention, the frequency division circuit includes both a variable counter and a fixed counter, wherein the variable counter is programmable and the fixed counter is not. Such an embodiment is advantageous, for example, if the oscillation frequency is substantially higher than desired. For example, if the oscillation frequency is around 1000 kHz and the desired frequency is between 1-10 kHz, it may be desirable to use a fixed counter of 100, to generate a starting frequency of 10 kHz. This would decrease the amount of time required to calibrate the frequency, and increase the amount of time available for communicating information.

In a third embodiment of the present invention, the frequency division circuit includes more than one variable counter. Such an embodiment allows the frequency of the tag to be adjusted more than once. For example, a coarse frequency adjustment could be made at the factory and a fine frequency adjustment could be made in the field. This would allow each tag to be partially programmed according to known condition (e.g., the frequency of the oscillator, the environment in which the tag will be used, etc.) and then trimmed to select a desired frequency. For example, if the oscillation frequency is 100 kHz and the desired frequency is between 1-10 kHz, the first variable counter could be programmed (e.g., at the factory, etc.) to divide by ten. If, however, the oscillation frequency is 120 kHz, the first variable counter could be programmed (e.g., at the factory, etc.) to divide by twelve.

In a fourth embodiment of the present invention, frequency related information (e.g., as provided by a frequency-control signal, etc.) is received by the RF tag and stored in a memory device. The frequency information (e.g., frequency data, counter data, etc.) is then used to extract information from and/or modulate information onto received RF signals. In one embodiment of the present invention, this is accomplished by using the frequency information to program a programmable oscillator. The resulting frequency is then used, for example, to decode and/or module a received RF signal. In another embodiment of the present invention, the frequency information is alternately (or also) used to program a programmable counter. As previously discussed, the programmable counter (e.g., together with an oscillator, another counter, etc.) can be used to produce a particular frequency, which in turn can be used to decode and/or module a received RF signal.

In a fifth embodiment of the present invention, the oscillator can also (or alternately) be used to measure the width of a calibration signal (e.g., as sent from an RFID base station). The measured data is then stored in memory and used to identify signals received thereafter. For example, in one embodiment of the present invention, the reception of a logic one calibration signal triggers the counting of pulses (or cycles) produced by an oscillator. The counting stops once the signal is no longer being received. The resulting count, which corresponds to the width of the logic signal, is then stored in memory and used to determine the logic of subsequently received signals (e.g., by comparing counts, etc.). A similar calibration may also (or alternately) be performed on a logic zero calibration signal.

A more complete understanding of a system and method for setting an oscillator in an RFID tag will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a system and method for setting an oscillator in a radio frequency identification transponder (RFID tag). In the detailed description that follows, like element numerals are used to describe like elements illustrated in one or more figures.

Figure 1:
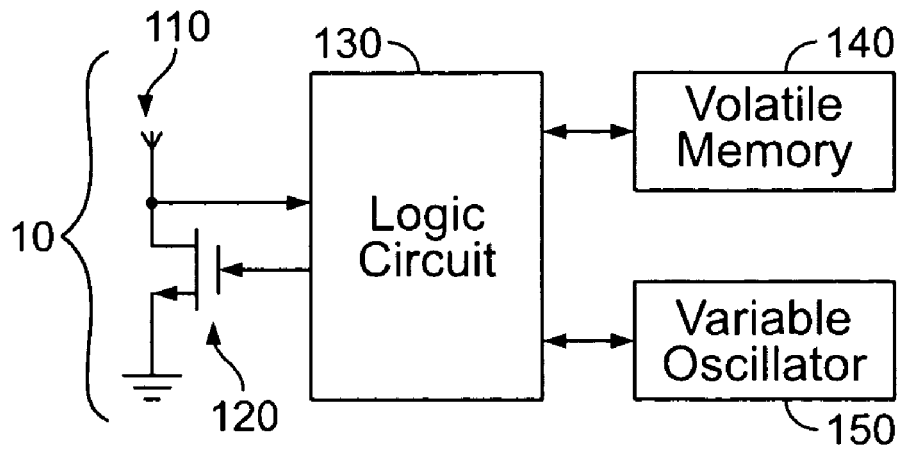
FIG. 1 is a conceptual block diagram of a prior art RFID transponder that includes a volatile memory device and a variable oscillator.

Traditional RFID tags perform frequency calibration every time the tag enters a "read zone" (e.g., encounters an interrogating signal from a new RFID base station). Such an RFID tag is shown in FIG. 1. Specifically, the tag 10 includes a logic circuit 130 connected to a volatile memory 140 and a variable oscillator 150, wherein the logic circuit 130 is adapted to receive an RF signal (e.g., an interrogating signal from an RFID base station) via antenna 110 and to modulate the RF signal via modulation circuit 120. The modulation circuit 120 may be used, for example, to impart information specific to the tag 10 onto the received RF signal. A reflection of the signal is then received by an RFID base station (not shown) and the modulated information is extracted.

In operation, the logic circuit 130 is further adapted to identify the frequency of the received RF signal (i.e., the carrier frequency) and the frequency of information modulated thereon (i.e., the modulation frequency). The modulation frequency is then stored in the volatile memory 140 and used by the variable oscillator 150 to generate a similar (or same) frequency. The generated frequency is then provided to the logic circuit 130 and used to modulate information onto the received RF signal (i.e., via the modulation circuit 120). This allows both the RFID tag 10 and the RFID base station (not shown) to modulate information onto an RF signal at the same frequency.

One drawback of such a circuit is that it uses an analog circuit (e.g., the variable oscillator) to perform frequency calibration, which takes up a large amount of real estate and draws a large amount of power (relatively speaking). Another drawback of such a circuit is that frequency calibration needs to be performed every time the tag enters a new "read zone." This is because the deduced modulation frequency is stored on volatile memory, which is generally powered down between "read zones." The present invention overcomes at least one of these drawbacks by using a memory device that includes at least a non-volatile portion and/or digital circuitry for performing at least a portion of the frequency calibration.

Figure 2:
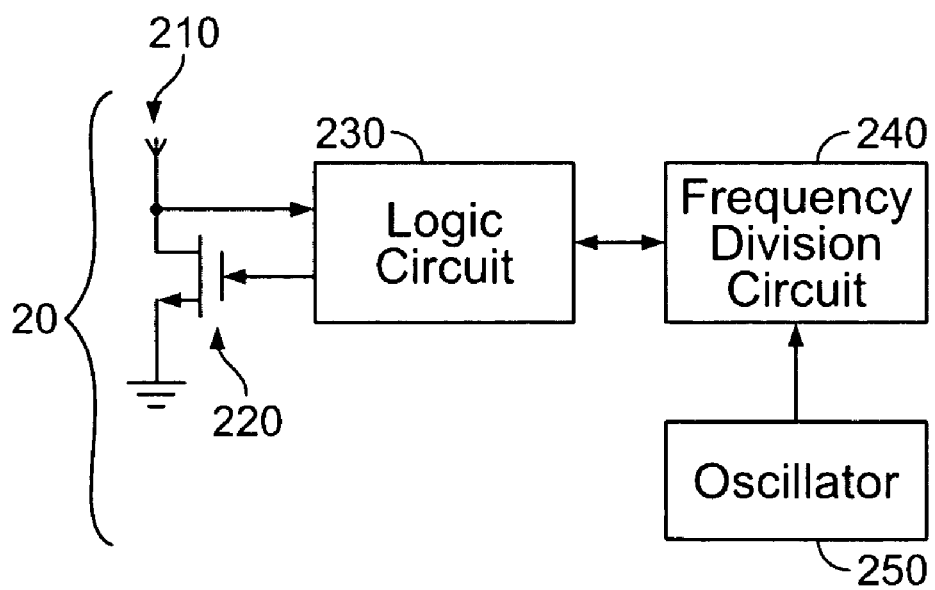
FIG. 2 is a conceptual block diagram of an RFID transponder operating in accordance with a preferred embodiment of the present invention.

An RFID tag in accordance with a preferred embodiment of the present invention is shown in FIG. 2. Specifically, the RFID tag 20 includes a frequency division circuit 240 connected to a logic circuit 230 and an oscillator 250. The logic circuit 230 is adapted to receive an RF signal from antenna 210 and to modulate information onto the RF signal via modulation circuit 220. The logic circuit 230 is further adapted to identify at least one frequency associated with the received RF signal. This may be, for example, the received RF signal's carrier frequency, the received RF signal's modulation frequency, a frequency associated with (or identified by) the received RF signal (e.g., a frequency-control signal as sent by the RFID base station), etc. The frequency is then used by the frequency division circuit 240 to calibrate the frequency provided by the oscillator 250.

It should be appreciated that the logic circuit depicted in FIG. 2 includes, but is not limited to, application specific integrated circuits (ASICs), digital signal processors (DSPs), microprocessors, programmable devices, state machines and all other computing devices generally known to those skilled in the art. It should further be appreciated that the oscillator depicted in FIG. 2 includes, but is not limited to, fixed oscillators, programmable oscillators, variable oscillators and all other frequency (or clock) generating devices generally known to those skilled in the art. It should also be appreciated that the type and number of components depicted in FIG. 2 are not considered limitations of the present invention, but are merely provided to illustrated one embodiment of the present invention. Thus, for example, an RFID tag that includes different components (e.g., a different modulation circuit, as known in the art, etc.) and/or more (or fewer) components (e.g., a memory device, multiple logic circuits, a temperature compensation circuit, etc.) is considered to be within the spirit and scope of the present invention.

In one embodiment of the present invention, the frequency division circuit 240 performs the frequency calibration function by dividing the frequency provided by the oscillator 250. For example, if the desired frequency (e.g., the frequency needed by the logic circuit) is 20 kHz and the frequency of the oscillator 250 is 100 kHz, then the frequency division circuit 240 would divide the oscillation frequency by five (100/5=20) and provide the resulting frequency (i.e., 20 kHz) to the logic circuit 230. Similarly, if the frequency of the oscillator 250 is 80 kHz, then the frequency division circuit 240 would divide the oscillation frequency by four (80/4=20). Thus, by using a frequency division circuit, the frequency provided by the oscillator can be calibrated to a desired (e.g., measured) frequency.

In another embodiment of the present invention, the frequency division circuit 240 functions as a multiplier, or a circuit that divides by fractions. Both types of circuits (i.e., frequency division circuits and frequency multiplication circuits) are considered to be within the spirit and scope of the present invention. For example, if the desired frequency (e.g., the frequency needed by the logic circuit) is 200 kHz and the frequency of the oscillator 250 is 20 kHz, then the frequency division circuit 240 would either multiple the oscillation frequency by ten (20×10=200), or divide by 1/10, and provide the resulting frequency (i.e., 200 kHz) to the logic circuit 230.

Figure 3:
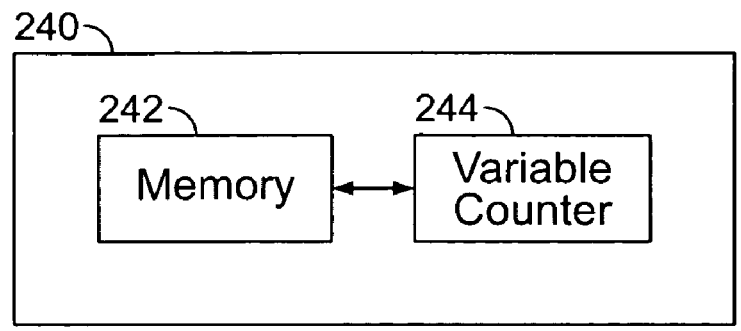
FIG. 3 illustrates a frequency division circuit that operates in accordance with a first embodiment of the present invention.

It should be appreciated that while the frequency division (or multiplication) circuit depicted in FIG. 2 is not limited to any particular type of circuit, exemplary circuits are provided herein that operate in accordance with embodiments of the present invention. For example, a first embodiment of the present invention is shown in FIG. 3. In this embodiment, the frequency division circuit 240 includes a variable counter 244 that can either be programmed at the factory (e.g., via hard wire signal) or in the field (e.g., via a frequency-control signal as sent by an RFID base station). In a preferred embodiment of the present invention, the programmable data includes a number at which the variable counter 244 provides an output pulse. Thus, for example, in order to program the variable counter 244 to perform a divide-by-four function, the counter is programmed to four (i.e., four pulses in=one pulse out).

In another embodiment of the present invention, where the variable counter 244 does not include an on-board memory device, the frequency division circuit 240 further includes a memory device 242. It should be appreciated that the memory device depicted in FIG. 3 includes, but is not limited to, FRAM, cache memory, flash memory, EPROMs, EEPROMs, registers, and all other types of data storage devices (volatile and non-volatile) generally known to those skilled in the art. It should further be appreciated that the while the embodiments depicted in FIGS. 4-5 do not include a memory device, one can be added if an on-board memory device is not included in the variable counter.

Figure 4:
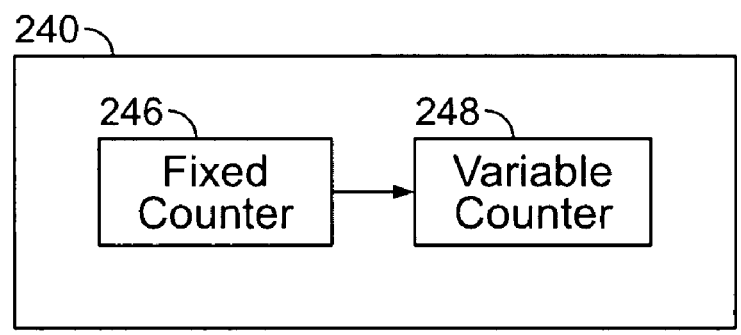
FIG. 4 illustrates a frequency division circuit that operates in accordance with a second embodiment of the present invention.

A second embodiment of the present invention is illustrated in FIG. 4. In this embodiment, the frequency division circuit 240 includes both a variable counter 248 and a fixed counter 246, wherein the variable counter 248 is programmable and the fixed counter 246 is not. Such an embodiment is advantageous, for example, if the oscillation frequency is substantially higher than desired. For example, if the oscillation frequency is around 1000 kHz and the desired frequency is between 1-10 kHz, it may be desirable to use a fixed counter of 100, to generate a starting frequency of 10 kHz. This would decrease the amount of time required to calibrate the frequency, and increase the amount of time available for communicating information. It should be appreciated that the fixed and variable counters depicted herein (e.g., 244, 246, 248a, etc.) include, but are not limited to, counters that include D flip-flops, SR flip-flops and/or logic gates and all other counting circuitry (digital, analog or any combination thereof) generally known to those skilled in the art.

Figure 5:
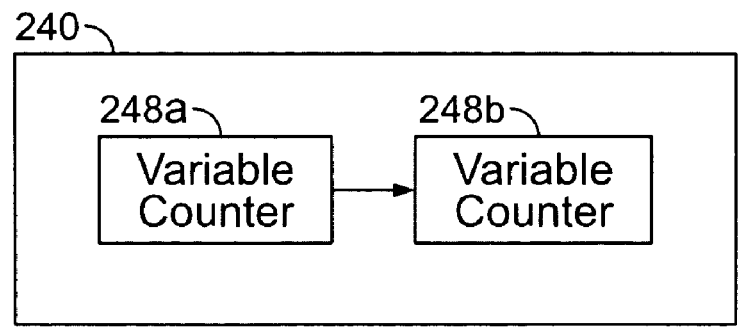
FIG. 5 illustrates a frequency division circuit that operates in accordance with a third embodiment of the present invention.

In a third embodiment of the present invention, as illustrated in FIG. 5, the frequency division circuit 240 includes more than one variable counter (i.e., 248a, 248b). Such an embodiment allows the frequency of the tag to be adjusted more than once. For example, a coarse frequency adjustment could be made at the factory and a fine frequency adjustment could be made in the field. This would allow each tag to be partially programmed according to known condition (e.g., the frequency of the oscillator, the environment in which the tag will be used, etc.) and then trimmed to select a desired frequency. For example, if the oscillation frequency is 100 kHz and the desired frequency is between 1-10 kHz, the first variable counter 248a could be programmed (e.g., at the factory, etc.) to divide by ten. If, however, the oscillation frequency is 120 kHz, the first variable counter 248a could be programmed (e.g., at the factory, etc.) to divide by twelve. It should be appreciated that the number of variable counters depicted in FIG. 5 is not considered a limitation of the present invention, and is merely provided to illustrate one embodiment of the present invention. Thus, for example, a frequency division circuit that includes more than two variable counters is considered to be within the spirit and scope of the present invention.

In a fourth embodiment of the present invention, frequency related information (e.g., as provided by a frequency-control signal, etc.) is received by the RF tag and stored in a memory device. The frequency information (e.g., frequency data, counter data, etc.) is then used to extract information from and/or modulate information onto received RF signals. In one embodiment of the present invention, this is accomplished by using the frequency information to program a programmable oscillator. The resulting frequency is then used, for example, to decode and/or module a received RF signal. In another embodiment of the present invention, the frequency information is alternately (or also) used to program a programmable counter. As previously discussed, the programmable counter (e.g., together with an oscillator, another counter, etc.) can be used to produce a particular frequency, which in turn can be used to decode and/or module a received RF signal.

In a fifth embodiment of the present invention, the oscillator can also (or alternately) be used to measure the width of a calibration signal (e.g., as sent from an RFID base station).

The measured data is then stored in memory and used to identify signals received thereafter. For example, in one embodiment of the present invention, the reception of a logic one calibration signal triggers the counting of pulses (or cycles) produced by an oscillator. The counting stops once the signal is no longer being received. The resulting count, which corresponds to the width of the logic signal, is then stored in memory and used to determine the logic of subsequently received signals (e.g., by comparing counts, etc.). A similar calibration may also (or alternately) be performed on a logic zero calibration signal.

Having thus described several embodiments of a system and method for setting an oscillator in an RFID tag, it should be apparent to those skilled in the art that certain advantages of the system and method have been achieved. It should also be appreciated that various modifications, adaptations, and alternative embodiments thereof may be made within the scope and spirit of the present invention. For example, the frequency division circuit could be used to calibrate the frequency to the carrier frequency. The invention is solely defined by the following claims.

What is claimed is:

1. A system for providing a target frequency in a radio frequency identification (RFID) transponder, comprising:
   an antenna for receiving a radio frequency (RF) signal having at least one characteristic center frequency;
   a modulation circuit electrically connected to said antenna;
   a logic circuit electrically connected to both said antenna and said modulation circuit and adapted to identify said at least one characteristic center frequency of said RF signal and to use said modulation circuit to modulate information onto said RF signal;
   an oscillator adapted to provide at least one other frequency; and
   a frequency-division circuit electrically connected to both said oscillator and said logic circuit and adapted to provide a target frequency based on said at least one other frequency, said target frequency and said at least one characteristic center frequency being substantially the same.

2. The system of claim 1, wherein said RF signal further comprises a characteristic center carrier frequency, said target frequency and said characteristic center carrier frequency being substantially the same.

3. The system of claim 1, wherein said RF signal further comprises a characteristic center modulation frequency, said target frequency and said characteristic center modulation frequency being substantially the same.

4. The system of claim 1, wherein said oscillator is a fixed oscillator.

5. The system of claim 1, wherein said frequency-division circuit further comprises a variable counter, said variable counter being adapted to divide said at least one other frequency by a stored value to produce said target frequency.

6. The system of claim 5, wherein said frequency-division circuit further comprises a memory device for storing said stored value.

7. The system of claim 1, wherein said frequency-division circuit further comprises a fixed counter and a variable counter, said fixed counter being adapted to divide said at least one other frequency by a fixed value to produce an intermediate frequency and said variable counter being adapted to divide said intermediate frequency by a stored value to produce said target value.

8. The system of claim 1, wherein said frequency-division circuit further comprises a first and second variable counter, said first variable counter being adapted to divide said at least one other frequency by a first stored value to produce an intermediate frequency and said second variable counter being adapted to divide said intermediate frequency by a second stored value to produce said target value.

9. A method for producing a target frequency for a radio frequency identification (RFID) transponder, comprising:
   receiving a radio frequency (RF) signal having at least one characteristic center frequency;
   identifying said at least one characteristic center frequency;
   producing at least one other frequency;
   computing an approximate ratio between said at least one other frequency and said at least one characteristic center frequency; and
   dividing said at least one other frequency by said approximate ratio to produce a target frequency, wherein said target frequency and said at least one characteristic center frequency are substantially the same.

10. The method of claim 9, wherein said step of receiving an RF signal having at least one characteristic center frequency further comprises receiving an RF signal having a characteristic center modulation frequency, wherein said target frequency and said characteristic center modulation frequency are substantially the same.

11. The method of claim 10, further comprising the step of using said target frequency to modulate information onto said RF signal.

12. The method of claim 9, wherein said step of receiving an RF signal having at least one characteristic center frequency further comprises receiving an RF signal having a characteristic center carrier frequency, wherein said target frequency and said characteristic center carrier frequency are substantially the same.

13. The method of claim 9, wherein said step of producing at least one other frequency further comprises producing at least one additional frequency and dividing said at least one additional frequency by a fixed value to produce said at least one other frequency.

14. The method of claim 9, wherein said step of producing at least one other frequency further comprises producing at least one additional frequency and dividing said at least one additional frequency by a programmable value to produce said at least one other frequency.

* * * * *